(12) United States Patent
Feng et al.

(10) Patent No.: US 9,513,941 B2
(45) Date of Patent: Dec. 6, 2016

(54) CODELESS GENERATION OF APIS

(71) Applicant: StrongLoop, Inc, San Mateo, CA (US)

(72) Inventors: Zhaohui Feng, Fremont, CA (US); Ritchie Tyler Martori, Fremont, CA (US); Miroslav Bajitoš, Hradec Králové (CZ); Albert K. Tsang, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/490,651

(22) Filed: Sep. 18, 2014

(65) Prior Publication Data

US 2016/0077897 A1      Mar. 17, 2016

Related U.S. Application Data

(60) Provisional application No. 62/051,924, filed on Sep. 17, 2014.

(51) Int. Cl.
| | |
|---|---|
| *G06F 3/00* | (2006.01) |
| *G06F 9/455* | (2006.01) |
| *H04L 29/08* | (2006.01) |
| *G06F 21/62* | (2013.01) |
| *G06F 9/54* | (2006.01) |
| *G06F 9/46* | (2006.01) |

(Continued)

(52) U.S. Cl.
CPC .......... *G06F 9/45529* (2013.01); *G06F 9/466* (2013.01); *G06F 9/54* (2013.01); *G06F 9/541* (2013.01); *G06F 9/547* (2013.01); *G06F 21/6236* (2013.01); *H04L 67/02* (2013.01); *H04L 67/1097* (2013.01); *H04L 67/42* (2013.01); *G06F 21/335* (2013.01); *G06F 21/6218* (2013.01); *G06F 2221/2141* (2013.01)

(58) Field of Classification Search
CPC .............................. G06F 9/54; G06F 9/30289
USPC ........................................... 719/328; 707/609
See application file for complete search history.

(56) References Cited

U.S. PATENT DOCUMENTS

| | | | | |
|---|---|---|---|---|
| 8,874,621 | B1 * | 10/2014 | Goodwin | .......... G06F 17/30569 707/756 |
| 2008/0235280 | A1 * | 9/2008 | Schoen | ............. G06F 17/30286 |

(Continued)

OTHER PUBLICATIONS

Jitendra Kotamraju, Java API for JSON Processing: An Introduction to JSON, Jul. 2013.*

*Primary Examiner* — Lechi Truong
(74) *Attorney, Agent, or Firm* — Adeli LLP (57) ABSTRACT

Some embodiments provide method of generating application programming interfaces (APIs) in a codeless manner. The method generates a schema description of a data storage with which an API-accessible object may have to exchange data (e.g., from which the object may have to read data and/or to which the object may have to write data) to process an API request during the execution of an application. Based on the generated schema description, the method constructs one or more data graphs, with each data graph representing one set of relationships between different sets of fields in the data storage. After generating the data graphs, the method generates a large number of possible API permutations by using the generated data graphs. The method presents the generated sample APIs so that a developer can select and customize one or more APIs while developing an application.

25 Claims, 7 Drawing Sheets

(51) Int. Cl.
*H04L 29/06* (2006.01)
*G06F 21/33* (2013.01)

(56) References Cited

U.S. PATENT DOCUMENTS

| | | | |
|---|---|---|---|
| 2008/0313660 A1* | 12/2008 | Malik | G06F 9/547 719/330 |
| 2012/0089562 A1* | 4/2012 | Deremigio | G06F 17/30563 707/602 |
| 2014/0047368 A1* | 2/2014 | Yang | G06F 3/0484 715/769 |
| 2014/0372861 A1* | 12/2014 | Lawless | G06F 17/243 715/224 |

* cited by examiner

CODELESS GENERATION OF APIS

CLAIM OF BENEFIT TO PRIOR APPLICATION

This application claims benefit to U.S. Provisional Patent Application 62/051,924, filed Sep. 17, 2014, which is incorporated herein by reference.

BACKGROUND

With the proliferation of mobile devices and applications that run on mobile devices, the need for servers that can process application programming interface (API) requests from the mobile devices and their applications has never been greater. Traditional servers provide APIs that, in order to be generated and used, require a lot of code writing by the application developers. In other words, currently, an application developer should first get familiarized with the server that the developer wishes to interact with (to send data to and/or receive data from). The developer then has to write numerous lines of code (in a particular programming language) for the framework installed on the server, to be able to execute and generate the desired APIs. Moreover, the developer should be familiarized with the database, with which the developer's application exchanges data, and use the exact syntax, required by the database, in the program to be able to make this data exchange.

SUMMARY

Some embodiments of the invention provide a novel method of generating application programming interfaces (APIs) in a codeless manner. The method of some embodiments receives the identity of a data storage (e.g., of a relational database). The method then identifies the storage schema (e.g., the relational database schema) of the identified data storage, and generates a description of the identified storage schema. For instance, in some embodiments where the storage schema is a relational database, the generated schema description is in form of several JavaScript Object Notation (JSON) models, with each model representing a table in the relational database. In some embodiments, the method receives a set of access credentials with the identity of the data storage, uses the credential to identify the portion of the data storage that is accessible with the received credential set, and then generates a schema description for the identified data-storage portion.

Based on the generated schema description, the method constructs one or more data graphs, with each data graph representing one set of relationships between different sets of fields in the data storage. For example, in some embodiments that specify one JSON-based model to represent one table in a relational database (RDB), the method constructs one data graph for each particular JSON-based model (i.e., for each particular RDB table) in order to specify the relationships between the particular model (i.e., the particular RDB table) and other JSON-based models (i.e., other RDB tables) that are related to the particular model.

In some embodiments, a first JSON-based model is related to a second JSON-based model when the first model's associated RDB table has a foreign key that references the RDB table that is associated with the second model. Also, by virtue of the second model, the first model can be indirectly related to a third JSON-based model when the second JSON-based model's RDB table has a foreign key that references the RDB table of the third model. In this manner, one JSON-based model can be indirectly related to any number of other JSON-based models through its direct or indirect relations with other JSON-based models. In some embodiments, each particular JSON-based model's data graph is a directed acyclic graph (DAG) with a root node that represents the JSON-based model, one or more child nodes that represent each JSON-based model that is directly related to the particular model, and one or more level of additional nodes that represent models that are related to the particular model through one or more levels of indirect relationships.

After generating the data graphs to represent the different sets of relationships between the different sets of fields in the data storage, the method generates a large number of possible API permutations by using the generated data graphs. For instance, in some embodiments that generate one data graph for each particular JSON-based model that represents a particular RDB table, the method generates one set of sample APIs for each node in the graph. The set of APIs for the root node represents a set of calls to a JS object that is instantiated from the JSON-based model. For each call, the JS object may have to exchange data by first analyzing the RDB table associated with the root node of the model's generated data graph.

Accordingly, an API that is generated for a root node represents a call that may need to be processed by the node's associated JS object accessing the RDB table that is associated with the root node. Similarly, an API for each particular non-root node represents a call that needs to be processed by accessing RDB table associated with the particular non-root node as well as accessing the RDB table of each node that is before the particular non-root node and is directly or indirectly connected to the particular non-root node in the DAG. In some embodiments, the set of APIs for all nodes is the same. For instance, in some embodiments, each node's set of APIs includes create, read, update, and delete (CRUD) APIs. In other embodiments, different nodes have different sets of generated APIs.

After generating the large number of possible API permutations, the method publishes the generated APIs so that a developer can select and customize the APIs individually. In some embodiments, the method publishes the APIs through a software development kit user interface and a web browser, so that the developer can scroll through the published APIs to identify one or more APIs to add to an application that is being developed. The developer can also customize the APIs that are selected through the provided user interface and web browser. Each selected and customized API will allow the application to pull data from the data storage that was initially identified. In some embodiments, the method publishes the APIs by using nonproprietary web services, such as the REST (Representational State Transfer) web services.

Once the developer selects and customizes an API that is presented with the other sample APIs, the method completes the API description and stores a representation of this API in the application that is being developed. In some embodiments, the completion of the API description entails completing a class description of an object for processing the API request at runtime. In some embodiments, the class description is defined in terms of JSON-based model, which includes a JSON file that describes the properties of the JSON-based model, and a JavaScript (JS) file that describes the behavior of the JSON-based model. When the application is executed, the JSON-based model is instantiated into a JS object based on the model's behavioral description in the JS file and its property description in the JSON file.

When API requests are directed to such an instantiated JS object, the JS object can exchange data (e.g., read, write, update, or delete data) with its associated data storage in order to formulate a response to the API request.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method of generating application programming interfaces (APIs) in a codeless manner. The method of some embodiments generates a schema description of a data storage (e.g., a relational database) with which an API-accessible object may have to exchange data (e.g., from which the object may have to read data and/or to which the object may have to write data) to process an API request during the execution of an application. Based on the generated schema description, the method constructs one or more data graphs, with each data graph representing one set of relationships between different sets of fields in the data storage. After generating the data graphs, the method generates a large number of possible API permutations by using the generated data graphs.

After generating the large number of possible API permutations, the method presents the generated sample APIs so that a developer can select and customize one or more APIs while developing an application. Each selected API will allow the application to exchange data with the data storage. Once the developer selects and customizes a presented sample API, the method completes a description of the object for processing the selected API and stores this description as part of the application that is being developed. When the application is being executed, the object is instantiated to process API requests by exchanging data (e.g., reading, writing, posting and/or deleting data) with the data storage in order to formulate a response to the API request.

Figure 1:
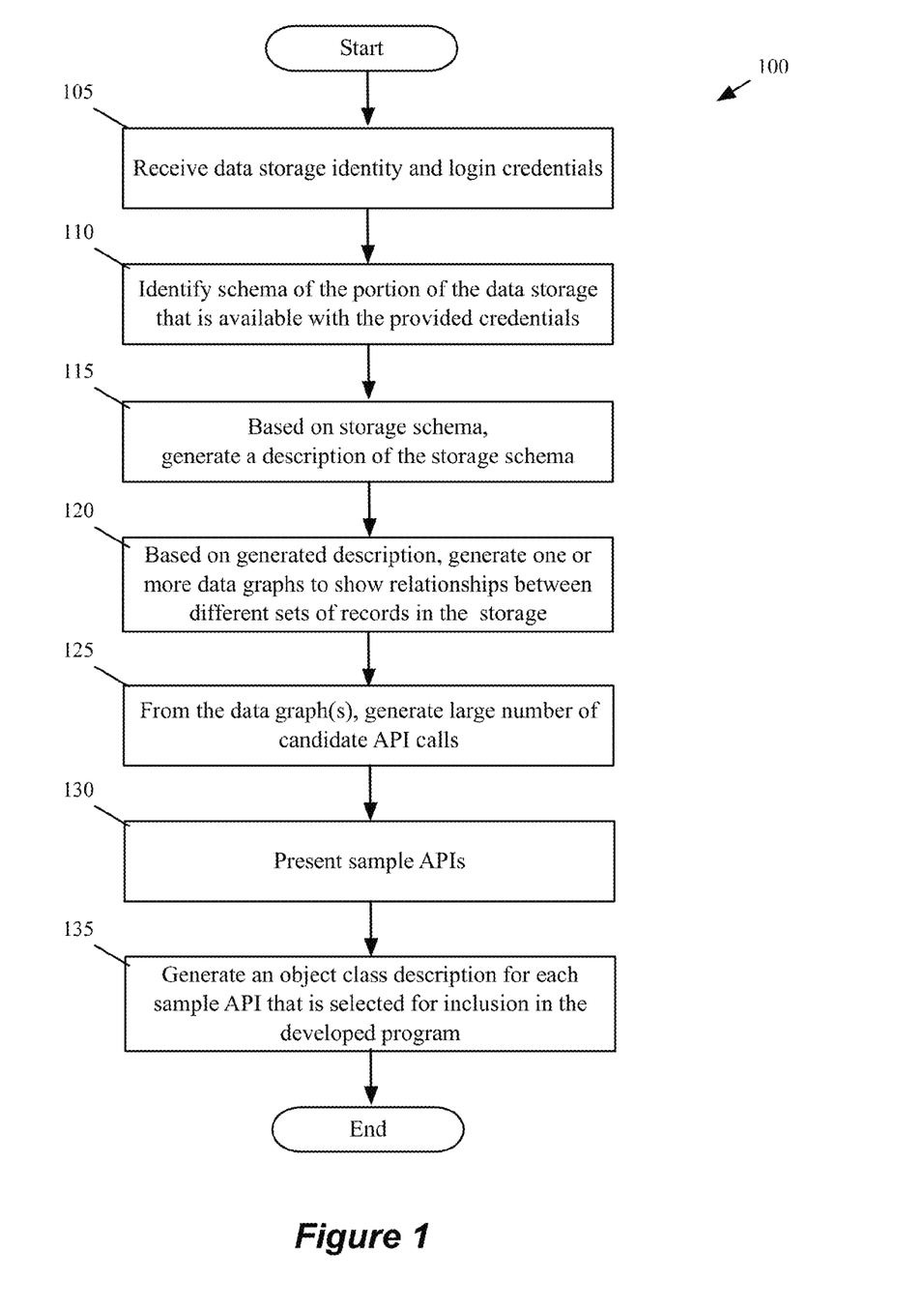
FIG. 1 conceptually illustrates a codeless API-generation process of some embodiments of the invention.

FIG. 1 illustrates a codeless API-generation process 100 of some embodiments of the invention. This process is performed by the software development kit (SDK) of some embodiments of the invention. A developer interacts with this SDK process while developing a program, such as a mobile application and/or an API server that handles API requests from the mobile application. In some embodiments, the process is implemented by a novel API server that is further described in the concurrently filed U.S. patent application Ser. No. 14/490,640, entitled "Method of Defining JavaScript Objects," which is incorporated herein by reference.

As shown, the process 100 initially receives (at 105) the identity of a data storage (e.g., of a relational database). At 105, the process may also receive a set of credentials (e.g., login credentials, such as username and password) for accessing the identified data storage. The process then identifies (at 110) the storage schema (e.g., the relational database schema) of the identified data storage. When the process receives a set of access credentials at 105, the process 100 (at 110) uses the provided credential set to identify the portion of the data storage that is accessible with the credential set.

Based on the storage schema identified at 110, the process generates (at 115) a schema description for the data storage or for the portion of the data storage that is accessible with the provided credential set. As further described below, some embodiments define one or more JSON-based models to describe the identified data storage schema. For instance, when the data storage is a relational database, the process 100 of some embodiments defines a JSON-based model for each RDB table that is in the identified storage schema. In some embodiments, a JSON-based model includes a JSON file that describes one set of data tuples in the identified storage schema (e.g., the columns of an RDB table). More descriptions and examples of JSON files and their attributes are discussed and illustrated in the concurrently filed U.S. patent application Ser. No. 14/490,640, entitled "Method of Defining JavaScript Objects".

Based on the generated schema description, the process constructs (at 120) one or more data graphs, with each data graph representing one set of relationships between different sets of fields in the data storage. After generating the data graphs, the process generates (at 125) a large number of possible API permutations by using the generated data graphs. For instance, in some embodiments, the data graph is a directed acyclic node graph with each node representing one set of fields in the data storage, and a connection between a pair of nodes representing relationships between two related sets of fields.

In some of these embodiments, the process generates (at 125) one set of sample APIs for each node in the graph. The set of APIs for the graph's root node represents a call to the data storage just for one or more fields in the set of data fields for which the graph was constructed. The set of APIs for each particular non-root node represents a call that needs to be processed by accessing multiple sets of data-storage fields including the set of fields that is associated with the particular non-root node as well as the set of fields that are associated with each node that is before the particular non-root node (e.g, the parent and grandparents of the particular non-root node in DAG) and is directly or indirectly connected to the particular non-root node. In some embodiments, the set of APIs for all nodes is the same. For instance, in some embodiments, each node's set of APIs includes create, read, update, and delete (CRUD) APIs. In other embodiments, different nodes have different sets of generated APIs.

After generating the large number of possible API permutations, the process publishes (at 130) the generated APIs so that a developer can select and customize the APIs individually. In some embodiments, the process publishes the APIs through the SDK's user interface and a web browser, so that the developer can scroll through the presented APIs to identify one or more APIs to add to an application that is being developed. Each selected API will allow the application to pull data from the data storage identified at 105. In some embodiments, the process publishes the APIs by using nonproprietary web services, such as the REST (Representational State Transfer) web services.

Once the developer selects and customizes an API that is presented with the rest of the sample APIs, the process completes (at 135) the API description and stores a representation of this API in the application that is being developed. In some embodiments, the completion of the API description entails completing a class description of an object for processing the API request at runtime. In some embodiments, the class description is defined in terms of JSON-based model, which includes a JSON file that describes the properties of the JSON object, and a JavaScript (JS) file that describes the behavior of the JS object. When the application is being executed, the JSON-based model is instantiated into a JS object based on the model's behavioral description in the JS file and its property description in the JSON file. When API requests are directed to such an instantiated JS object, the JS object can exchange data (e.g., read, write, post or delete data) with its associated data storage in order to formulate a response to the API request.

Figure 2:
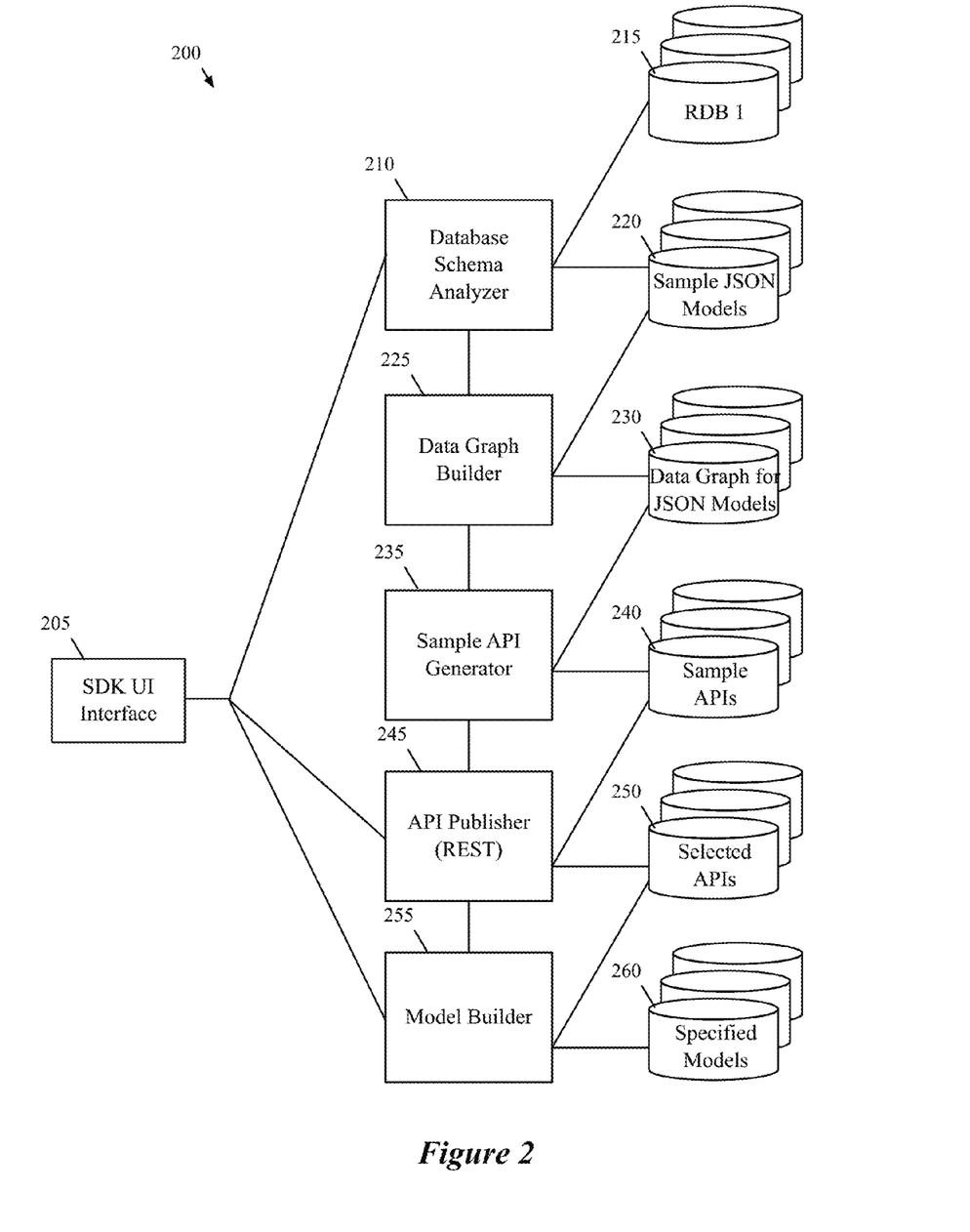
FIG. 2 illustrates a software development kit (SDK) of some embodiments that can be accessed to generate APIs in a codeless manner.

FIG. 2 illustrates a SDK 200 of some embodiments of the invention. A developer can use this SDK 200 to generate APIs in a codeless manner. As shown, the SDK 200 includes an SDK UI 205, an RDB schema analyzer 210, a data graph builder 225, a sample API generator 235, an API publisher 245, and a model builder 255. The SDK has access to one or more RDBs 215. As further described below, the SDK builds numerous JSON models 220, builds numerous data graphs 230, generates numerous sample APIs 240, receives the selection and customization of one or more selected APIs 250, and generates one or more JSON-based models 260.

The SDK UI 205 is the UI through which the SDK receives user input and provides SDK output to the user. The schema analyzer 210 identifies the schema of a relational database 215 that is identified by a developer. In some embodiments, the schema analyzer receives the identity of the relational database along with a set of access credentials for accessing the relational database. For instance, the schema analyzer receives a database discovery request through a command line API that provides (1) the credentials of a developer that requested the database discovery, and (2) the specification of the requested database. Alternatively, or conjunctively, the analyzer of some embodiments provides a Graphical User Interface (GUI) with a set of tools to receive the discovery request and the developer's credentials.

The schema analyzer 210 uses the credential set to identify the portion of the data storage that is accessible with the received credential set, and then generates one or more JSON-based models 220 to provide the description of the identified schema. The schema analyzer 210 of some embodiments retrieves a set of database fields (e.g. a table's columns metadata) of the data storage and, automatically or based on user inputs, maps these fields to a set of JSON files.

In some embodiments, each generated JSON-based model corresponds to a table in the relational database, and each JSON-based model includes a JSON file that describes the model's corresponding RDB table. In some embodiments, each JSON file includes one or more properties that correspond to one or more columns of the file's associated RDB table. From the generated JSON-based models, data graph builder 225 constructs one or more data graphs, with each data graph corresponding to one generated JSON-based model and representing the direct and indirect relationships between that model's RDB table and other tables in the RDB. Specifically, in some embodiments, the graph builder constructs one data graph for each particular JSON-based model (i.e., for each particular RDB table) in order to specify the relationships between the particular model (i.e., the particular RDB table) and other JSON-based models (i.e., other RDB tables) that are related to the particular model.

In some embodiments, a first JSON-based model is related to a second JSON-based model when the first model's associated RDB table has a foreign key that references the RDB table that is associated with the second model. Also, by virtue of the second model, the first model can be indirectly related to a third JSON-based model when the second JSON-based model's RDB table has a foreign key that references the RDB table of the third model. In this manner, one JSON-based model can be indirectly related to any number of other JSON-based models through its direct or indirect relations with other JSON-based models. In some embodiments, each particular JSON-based model's data graph is a directed acyclic graph (DAG) with a root node that represents the JSON-based model, one or more child nodes that represent each JSON-based model that is directly related to the particular model, and one or more level of additional nodes that represent models that are related to the particular model through one or more levels of indirect relationships.

Figure 3:
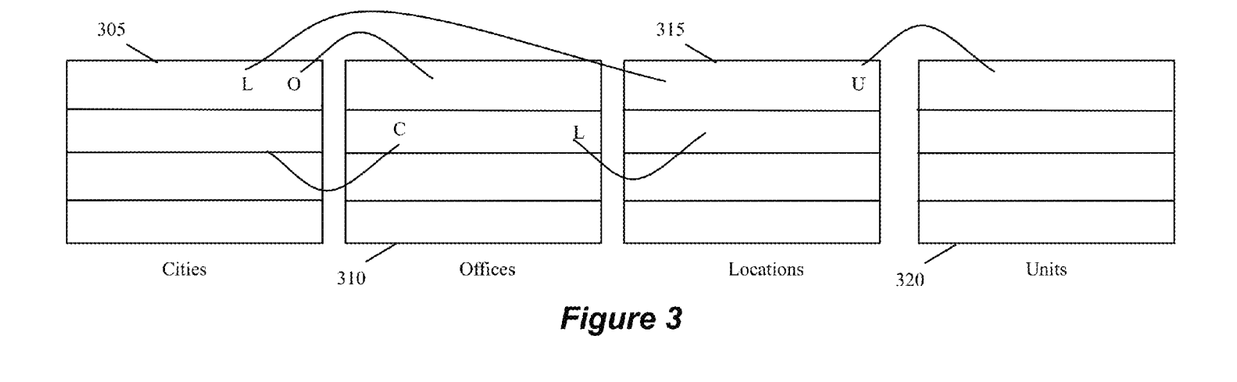
FIG. 3 illustrates an example of relationships between four relational database (RDB) tables.
Figure 4:
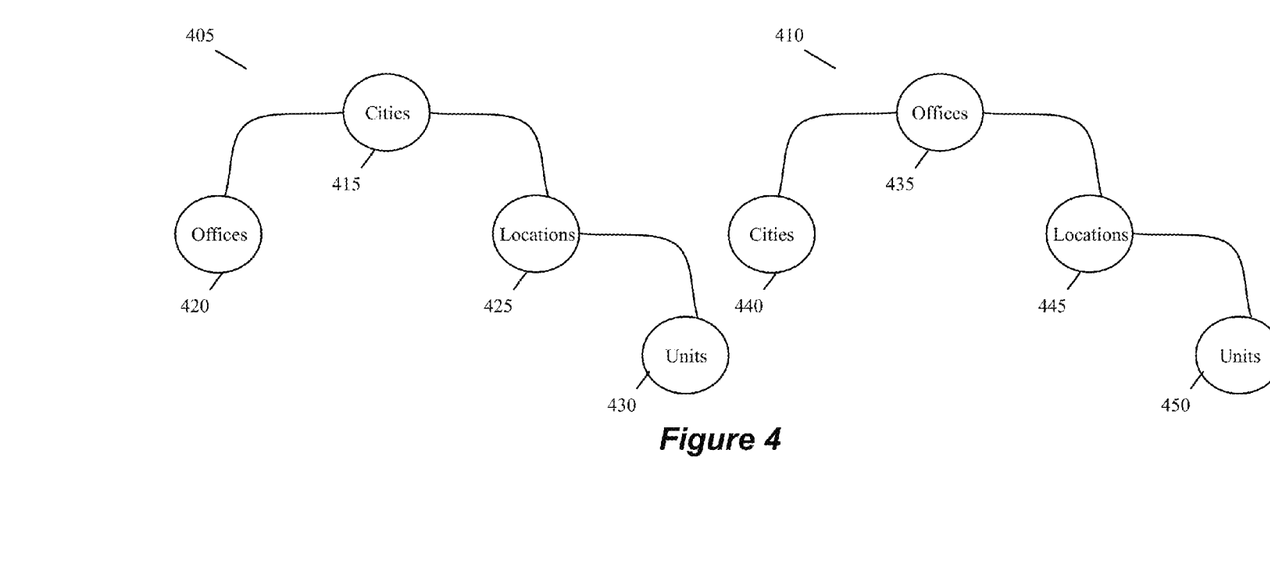
FIG. 4 illustrates two directed acyclic graphs (DAGs) of some embodiments generated for the RDB tables of FIG. 3.

FIGS. 3 and 4 illustrate an example of generating data graphs for one set of related RDB tables. FIG. 3 illustrates four RDB tables, which include a Cities table 305, an Offices table 310, a Locations table 315, and a Units table 320. These tables are used to describe apartments that a real estate management company operates. The Cities table 305 lists the cities in which the company manages properties. The Offices table 310 lists the branch offices of the company. The Locations table 315 lists the locations of the managed apartment complexes. The Units table lists 320 the units within each apartment complex.

As shown, the Cities table 305 includes references to the Offices and Locations tables 310 and 315, the Office table 310 includes references to the Cities and Locations tables 305 and 315, and the Locations table includes references to the Units table 320. For each of these tables 305-320, the data graph builder 225 generates a DAG node graph.

FIG. 4 illustrates two such graphs, which are graph 405 for the Cities table and the graph 410 for the Offices table. As shown, each illustrated graph has four nodes, with each node representing one of the four tables. In this example, each graph has one node for each table, because each table is directly or indirectly related to each of the other three tables. The Cities graph 405 has a root node 415 corresponding to the Cities table 305, while the Offices graph 410 has a root node 435 corresponding to the Offices table 310.

In the Cities graph 405, the Cities root node 415 has two child nodes 420 and 425 that correspond to the Offices and Locations tables 420 and 425, while the Locations node 425 has a Units child node 430 that corresponds to the Units table 320. Similarly, in the Offices graph 410, the Offices root node 435 has two child nodes 440 and 445 that correspond to the Cities and Locations tables 305 and 315, while the Locations node 445 has a Units child node 450 that corresponds to the Units table 320.

After the graph builder 225 generates the data graphs to represent the different sets of relationships between the different tables of the relational database, the sample API generator 235 generates a large number of possible API permutations by using the generated data graphs. For instance, in some embodiments that generate one node graph for each particular JSON-based model that represents a particular RDB table, the API generator 235 produces one set of sample APIs for each node in the graph. The set of APIs for the root node represents a set of APIs call to a JS object that is instantiated from the JSON-based model. For each call, the JS object may have to exchange data with the database by first analyzing the RDB table associated with the root node of the model's generated data graph.

More specifically, an API call that is generated for a root node is a call that may need to be processed by the node's associated JS object by accessing the RDB table that is associated with the root node. An API call for each particular non-root node represents a call that needs to be processed by accessing RDB table associated with the particular non-root node as well as accessing the RDB table of each node that is before the particular non-root node (e.g., the parents, grandparents, etc. of the particular non-root node in DAG) and is directly or indirectly connected to the particular non-root node. In some embodiments, an API call for each non-root node is an aggregated API call, in that, processing this call requires access to two or more database objects (e.g., RDB tables).

In some embodiments, the set of APIs for all nodes is the same. For instance, in some embodiments, each node's set of APIs includes create, read, update, and delete (CRUD) APIs. Using this approach, the sample API generator 235 would generate sixteen APIs (i.e., 4 sets of CRUD APIs) for the four nodes of the data graph 405, and generate sixteen APIs (i.e., 4 sets of CRUD APIs) for the for nodes of the data graph 410. In other embodiments, different nodes have different sets of generated APIs. In some embodiments, the format of each set of APIs for the four tables 305-320 is as follows in some embodiments:

Get/Cities
Put/Cities
Post/Cities
Delete/Cities
Get/Cities/Offices
Put/Cities/Offices
Post/Cities/Offices
Delete/Cities/Offices
Get/Cities/Locations
Put/Cities/Locations
Post/Cities/Locations
Delete/Cities/Locations
Get/Cities/Locations/Units
Put/Cities/Locations/Units
Post/Cities/Locations/Units
Delete/Cities/Locations/Units After the API sample generator produces the large number of possible API permutations, the API publisher 245 publishes the generated APIs so that a developer can select and customize the APIs individually. In some embodiments, the publisher 245 makes the APIs available through the SDK user interface 205. In some embodiments, the available APIs can be accessed by a developer through a web browser (not shown) that allows the developer to scroll through the presented APIs to identify one or more APIs to add to an application that is being developed. Each selected API will allow the application to exchange data with the relational database that was used to generate the API. In some embodiments, the publisher 245 publishes the APIs by using non-proprietary web services, such as the REST (Representational State Transfer) web services.

As mentioned above, each sample API corresponds to a JSON-based model, which includes a JSON file with one or more properties that correspond to one or more fields of the file's associated RDB table. Accordingly, in some embodiments, the model builder 255 of the SDK allows the developer to customize a selected sample API by specifying or adjusting one or more JSON file properties (corresponding to one or more fields of the corresponding RDB table) in the selected API. To specify and/or adjust one or more JS-file properties, the SDK UI that is presented in a browser window provides a set of controls (e.g., drop down windows or contextual pop-up windows that can be provided for a presented API) for displaying the properties (e.g., the database field or keys) of a database table that is identified in a sample presented API request. With such a set of controls, the developer can narrow the specified API request to account for one or more properties of one or more tables that have to be accessed to process the API request. For example, for the Get API request that relies on Cities and Offices tables, the API request can be customized to state:

Get/Cities/Offices/{main}, in order to have the Get API retrieve a record associated with the main office of each city.

Once the developer selects and customizes an API that is presented with the other sample APIs, the model builder 255 completes the API description and stores a representation of this API in the application that is being developed. In some embodiments, the completion of the API description entails completing a class description of a JS object for processing the API request at runtime. As mentioned above, the SDK 200 defines the class description in terms of JSON-based model, which includes a JSON file that describes the properties of the JSON object, and a JavaScript (JS) file that describes the behavior of the JS object. Accordingly, in these embodiments, the model builder 255 completes the class description by completing the JS file and JSON file descriptions based on the developer's customization of the selected API.

When the application is being executed, the JSON-based model is instantiated into a JS object based on the model's behavioral description in the JS file and its property description in the JSON file. When API requests are directed to such an instantiated JS object, the JS object can exchange data (e.g., read, write, post or delete data) with its associated data storage in order to formulate a response to the API request.

In the example illustrated in FIGS. 3 and 4, the sample API generator generates a set of APIs for each node in a data graph. However, in some embodiments, this might not be the case. For instance, in some embodiments, one node connects to one or more grandchild nodes through a child node. These connections are referred to below as pass-through connections. For such pass-through connections, the API generator skips the generation of a set of APIs for the child node, as it is simply a pass-through node. Instead, the API generator generates sets of APIs for each grandchild node that refers to the grandchild node's associated table and its grandparent node's associated table.

Figure 5:
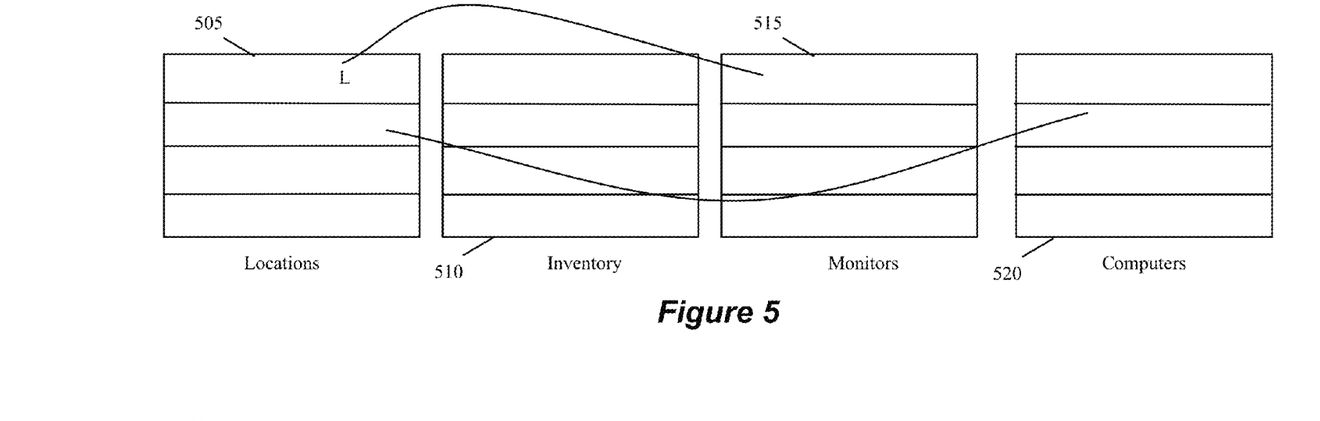
FIG. 5 illustrates another example of relationships between four RDB tables of some embodiments.
Figure 6:
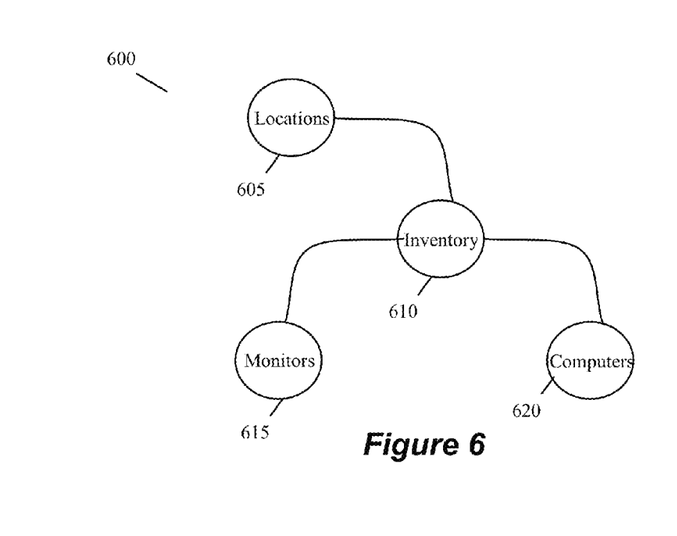
FIG. 6 illustrates two data graphs that some embodiments generate based on the relationships between the tables of FIG. 5.

To illustrate this, FIGS. 5 and 6 illustrate an example of generating a data graph that includes a pass-through node. FIG. 5 illustrates four tables in a relational database. These tables are a locations table 505, an inventory table 510, a monitors table 515, and a computers table 520, with the latter two tables 515 and 520 being child tables of the inventory table 510. In this example, the locations table 505 has pass-through relationships with the monitors table 515 and the computers table 520 that pass through the inventory table 510. In some embodiments, each pass-through relationship is defined in terms of "hasManyThrough" relationship value that in the JSON file of the locations table, defines the relationship between the locations table and the inventory table.

Figure 7:
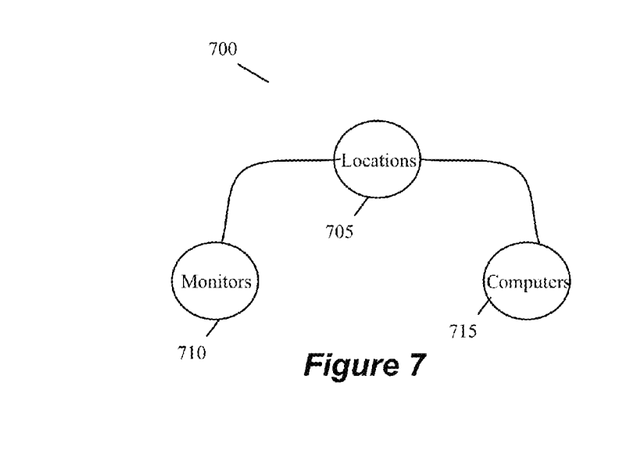
FIG. 7 illustrates a method of generating data graph nodes that foregoes adding a node to a data graph for a pass through table.

FIG. 6 illustrates a data graph 600 that is constructed based on the relationships between the tables 505-520. As shown, this graph includes locations, inventory, monitors, and computers nodes 605-620 that respectively correspond to the locations, inventory, monitors, and computers tables 505-520. Based on this graph, the API generator 235 of some embodiments generates three sets of APIs for the three nodes 605, 615, and 620. The API generator in these embodiments does not generate a set of APIs for the inventory node 610 (i.e., the node corresponding to the inventory table 510). This is because this node is designated in the graph as a pass-through node, which is meant to only establish an indirect relationship between its parent node 605 and its child nodes 615 and 620. The format of each set of APIs for the three tables 505, 515, and 520 is as follows in some embodiments:

Get/Location
Put/Location
Post/Location
Delete/Location
Get/Location/Monitors
Put/Location/Monitors
Post/Location/Monitors
Delete/Location/Monitors
Get/Location/Computers
Put/Location/Computers
Post/Location/Computers
Delete/Location/Computers Some embodiments forego adding a node to a data graph for a pass through table. FIG. 7 illustrates one such approach. As shown, this approach generates a three-node graph, the nodes 705-715 corresponding to the locations, monitors, and computers tables 505, 515 and 520. When the graph builder 225 uses this approach, the API generator 235 generates a set of APIs for each node in the data graph.

Figure 8:
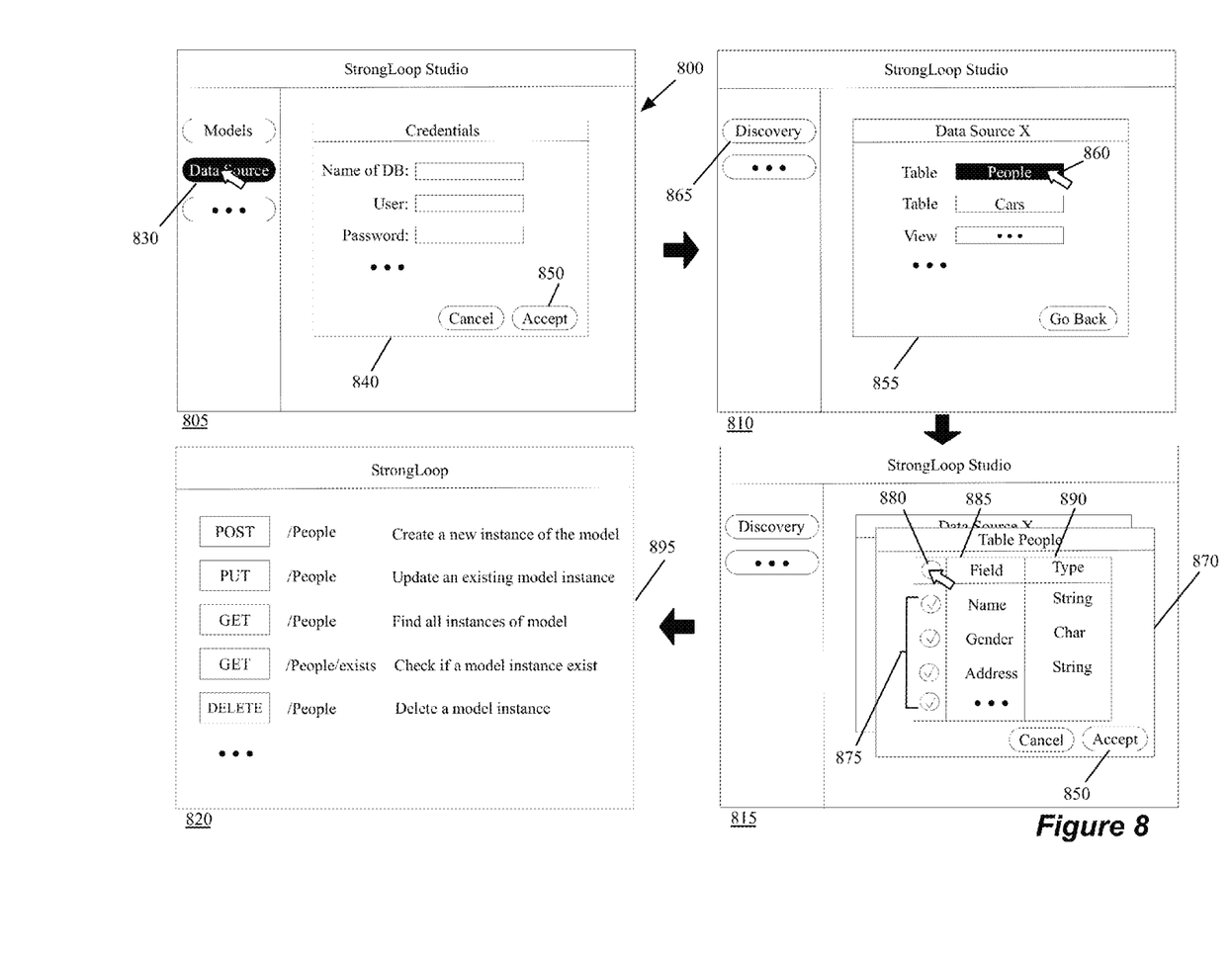
FIG. 8 conceptually illustrates how a user requests a database schema discovery by interacting with a GUI of some embodiments.

Some embodiments provide a Graphical User Interface (GUI) with a set of tools to (1) receive a set of credentials from an application (e.g., mobile application) developer along with a data storage schema discovery request, and (2) present a set of APIs (e.g., REST APIs) to the developer to select from and customize. The selected and customized APIs, as discussed above, can be later incorporated in the developer's application so that the application's user would be able to interact with the data storage through a set of API calls generated by the application. FIG. 8 illustrates one such GUI. More specifically, FIG. 8 illustrates how a user requests for a database schema discovery by interacting with the GUI 800 in four different operational stages 805-820.

In the first stage 805, a user (e.g., application developer) has initiated a database discovery request by selecting the data source control 830 (e.g., through a mouse or trackball, a stylus, keyboard, a finger gesture (e.g., placing, pointing, tapping one or more fingers) near a near-touch sensitive screen, etc.). This stage also shows that upon selection of the UI control 830, a new credentials window 840 is opened to receive a set of credentials for the user. As described before, some embodiments identify which portion of the data storage is accessible to a particular user based on the credentials received from the particular user. In these embodiments, depending on the received credentials, a user can be denied to access a database or can be authorized to access only a portion of the database (e.g., access a limited number of tables and views in a relational database). This stage also shows that beside the user's credentials, the name of the database and other information about the database must be given to the application. Some embodiments, as stated before, use the information to provide a description for the database schema to the user. After entering all the required information the user can select the accept control 850 to receive this database schema description.

The second stage 810 illustrates that the application, after receiving the credentials of the user and the information about the database, is showing a description of the authorized portion of the database. This is illustrated by data source window 855 that contains a list of data objects (e.g., a set of authorized tables, views, etc.) for the user to select. As shown in the stage 810, the user has selected the "People" table from the list of data objects by selecting its corresponding UI item 860. As mentioned before, a user can select any UI control or UI item by a mouse or trackball (clicking on a button of the mouse or trackball while the pointer is over the UI item), a stylus, keyboard, a finger gesture (e.g., placing, pointing, tapping one or more fingers) near a near-touch sensitive screen, etc. Although in the illustrated example, the user has selected only one table (i.e., "People" table), as mentioned before) the user can select any number of tables (e.g., all of the tables in the list) at this stage. After selecting the desired table(s), the user selects the Discovery control 865 to complete the selection of the tables and to receive a set of attributes for each selected table.

In the third stage 815, the GUI 800 presents a set of attributes of the selected table "People" to the user. As illustrated in this stage, the set of attributes is presented in the table window 870. The window 870 includes a column 885 that represents the name of the fields of the table, a column 890 that represents the data type for each corresponding field, and a set of UI controls 875, where each UI control is for selecting its corresponding field (placed in the same row as the UI control) in the table. Additionally, the user can select UI control 880 in order to select all the fields at once instead of selecting each field one by one. As shown in this example, the user has selected all the fields in the table "People."

As described above, when the user finishes selecting the set of attributes in the table (e.g., by selecting the accept control 850), the method of some embodiments automatically generates a JSON-based model for each table that the user has selected. In some embodiments, each JSON-based model includes a JSON file that describes one set of data tuples in the corresponding selected table. For instance, in the illustrated example, the method generates a JSON-based model for "People" table. In some embodiments, the name of the model is the same as the name of the table (e.g., People in this example). The generated JSON-based model also has a JSON file with a set of properties that corresponds to the set of fields selected by the user (e.g., Name, Gender, Address, etc.).

Additionally, and as described above, some embodiments generate and publish a set of APIs for each generated model so that a developer can select and customize the APIs individually. In some embodiments, the APIs are REST APIs that are published through nonproprietary web services, such as REST web services, so that the developer can scroll through the published APIs to select and customize one or more of the published APIs, and to add the selected and customized APIs to an application that is being developed. The fourth stage 820 illustrates a web browser 895 that publishes such generated APIs for a user to select and customize. Since in the illustrated example only one model is generated, the set of published APIs relates to that model. The set of published APIs shown in stage 820 includes four different API calls that all, when processed, access the table "People" in the database and interact with the table by writing, reading, updating, or deleting data to and from the table.

Figure 9:
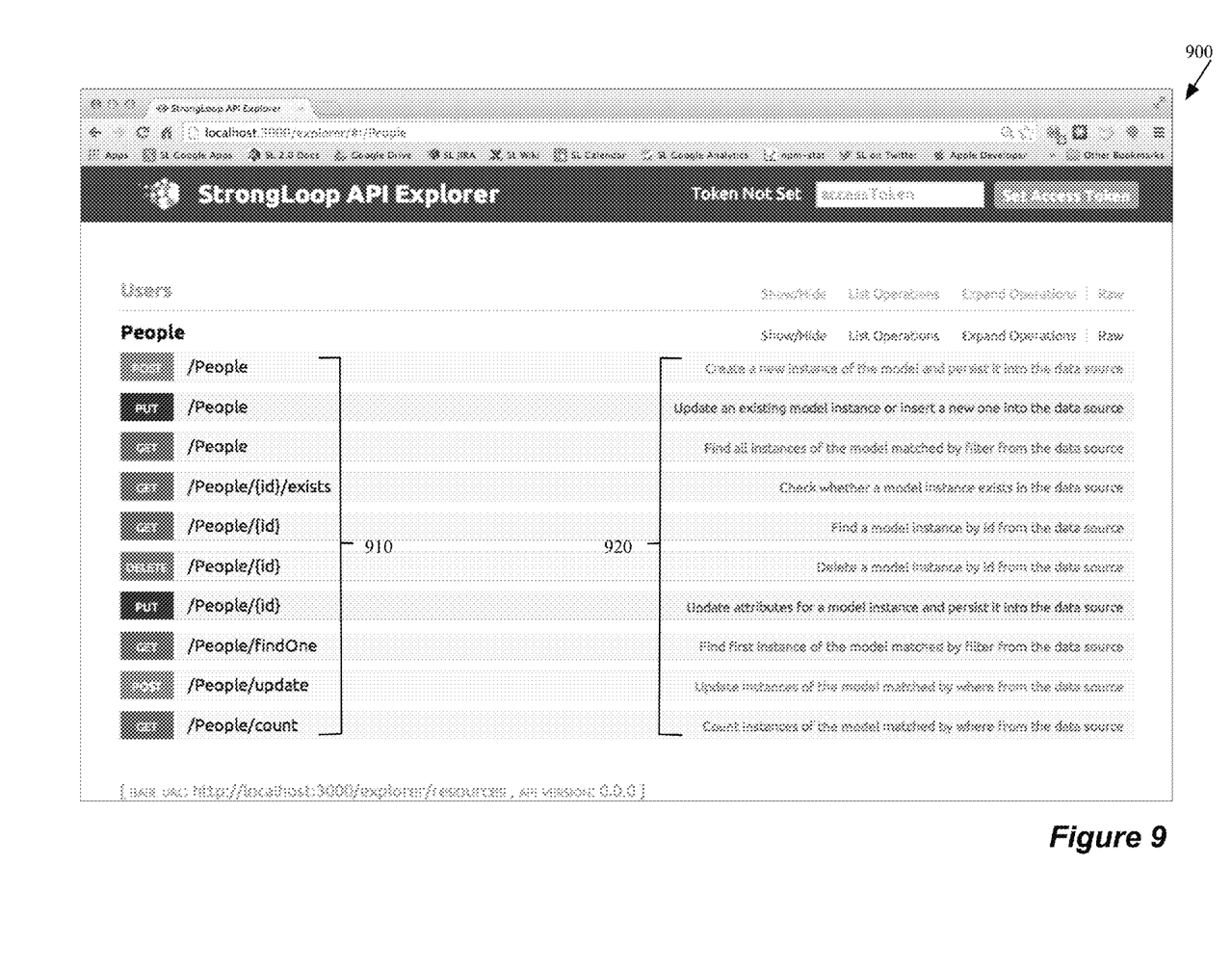
FIG. 9 illustrates a real example of a web browser of some embodiments that presents a set of published APIs to a developer.

FIG. 9 illustrates a real example of a web browser 900 that presents a set of published APIs to a user (e.g., a developer). As described before, the browser of some embodiments presents the APIs in REST form to make simple the inclusion of API calls in the developer's application. As illustrated in the figure, the browser 900 presents a set of APIs 910 and a set of descriptions 920 for the set of APIs. The developer can scroll through the presented APIs to identify one or more APIs to add to an application that is being developed. Each selected API will allow the application to pull data from the data storage that is identified in the database discovery request.

The figure also illustrates that there are four common REST API calls (i.e., POST, PUT, GET, and DELETE) in the set of API calls that are for exchanging data with a table "People," through a JSON-based model (with the same name). The figure also shows that there are other API's in the set of APIs that include additional attributes and/or filters. In the demonstrated example, the key {id} is one such attribute. Also in this example, additional filters include exists, FindOne, update, and count. Each of these filters help the developer to narrow down the operation further based on the characteristic of the individual filter.

In the codeless API discovery examples above, the API discovery tool is used to generate sample APIs for exchanging data with a relational database. However, one of ordinary skill will realize that API discovery methodology of some embodiments can be used to generate sample APIs that exchange data with other backend data storages. Moreover, in some embodiments, this methodology can be used (1) to generate different models that map to different storages, (2) to store these models in the system memory, and then (3) to generate additional models that interlink the different models (that may connect to different storages) by running the API discovery methodology to identify possible API permutations for the models that reside in the system memory.

Moreover, the models described in some of the above-mentioned embodiments are created through a database discovery schema. In some embodiments, a JSON-based model can be created through other means (e.g., APIs received from the command line, etc.). Different methods of creating JSON files and models are further described in the concurrently filed U.S. patent application Ser. No. 14/490,640, entitled "Method of Defining JavaScript Objects".

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
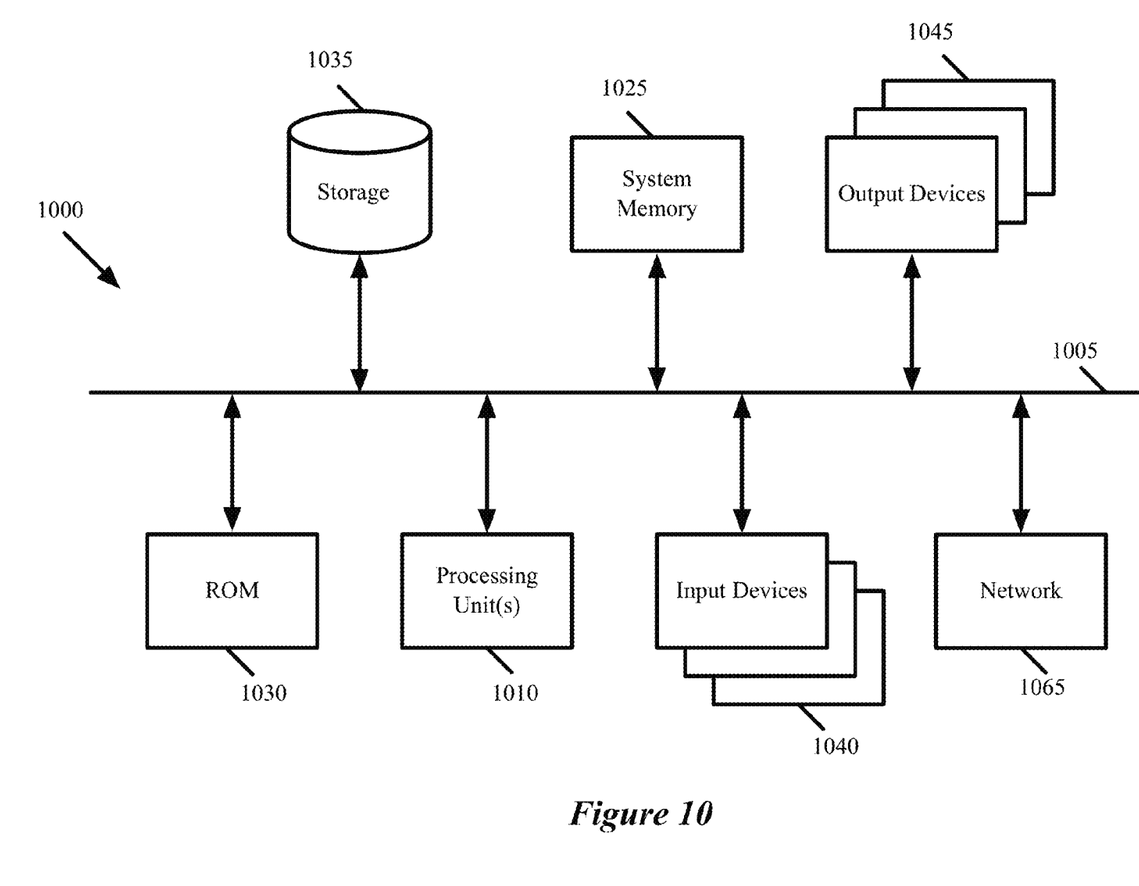
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. A method for generating a plurality of application programming interfaces (APIs) in a codeless manner, the method comprising:
receiving a request for a plurality of APIs based on a description of a database schema;
upon identifying the database schema description, generating a set of data graphs that identifies relationships between a set of data objects included in the description;
generating the plurality of APIs based on the set of data graphs and providing the generated APIs to a user for selecting a subset of the plurality of APIs; and
upon selection of an API, generating a JavaScript object notation based model (JSON-based model) associated with the selected API, the JSON-based model comprising a JSON file and a JavaScript (JS) file for an application to use to exchange data with the database.

2. The method of claim 1, wherein the selected API is used in an application for exchanging data with the database using the JSON-based model.

3. The method of claim 1, wherein receiving the request comprises receiving the request from the user, wherein the request further comprises a set of credentials of the user to determine what portion of the database is accessible to the user.

4. The method of claim 3, wherein the set of credentials comprises at least a user name and a user password.

5. The method of claim 1, wherein the identification of the database schema description comprises connecting to a data storage that includes the database.

6. The method of claim 5, wherein the connection to the data storage is through a data storage data abstractor and a data storage data connector.

7. The method of claim 1, wherein the database comprises a relational database (RDB).

8. The method of claim 7, wherein each data object in the set of data objects is a table in the RDB.

9. The method of claim 1, wherein the database is a relational database (RDB), wherein each data graph represents (i) a table in the RDB and (ii) the table's relationship with other tables of the RDB.

10. The method of claim 1, wherein the set of data graphs identifies the relationships between the set of data objects by identifying a set of foreign keys in the set of data objects.

11. The method of claim 1, wherein providing the plurality of APIs comprises presenting the plurality of APIs through Representational State Transfer (REST) web services.

12. The method of claim 1, wherein the selected API is called in the application at runtime to exchange data with the database.

13. The method of claim 12, wherein the application creates a JS object based on the JSON file and JS file of the JSON-based model associated with the API, wherein the application exchanges the data with the database through the JS object.

14. The method of claim 1, wherein the JS file comprises a set of behavioral descriptions of the JSON-based model and the JSON file comprises a set of property descriptions of the JSON-based model.

15. The method of claim 14, wherein the set of property descriptions of the JSON-based model is associated with a set of properties of a table in the database.

16. The method of claim 14, wherein the user customizes the selected API by modifying the set of property descriptions in the JSON file of the API's associated JSON-based model.

17. A non-transitory machine readable medium storing a program which, when executed by at least one processing unit of a device generates a plurality of application programming interfaces (APIs) in a codeless manner, the program comprising sets of instructions for:
receiving a request for a plurality of APIs based on a description of a database schema;
upon identifying the database schema description, generating a set of data graphs that identifies relationships between a set of data objects included in the description;

generating the plurality of APIs based on the set of data graphs and providing the generated APIs to a user for selecting a subset of the plurality of APIs; and
upon selection of an API, generating a JavaScript object notation based model (JSON-based model) associated with the selected API, the JSON-based model comprising a JSON file and a JavaScript (JS) file for an application to use to exchange data with the database.

18. The non-transitory machine readable medium of claim 17, wherein the set of instructions for receiving the request comprises a set of instructions for receiving the request from a user, wherein the request further comprises a set of credentials for the user to determine what portion of the database can be accessed by the user.

19. The non-transitory machine readable medium of claim 17, wherein the selected API is called in the application in order to exchange the data with the database.

20. The non-transitory machine readable medium of claim 17, wherein database is a relational database (RDB), wherein each data object in the set of data objects is a table in the RDB.

21. The non-transitory machine readable medium of claim 17, wherein the application creates an object at runtime based on the JSON file and JavaScript (JS) file of the JSON-based model, wherein the client application exchanges data with the database through the object when the API is called in the application.

22. The non-transitory machine readable medium of claim 17, wherein the JS file comprises a set of behavioral descriptions of the JSON-based model and the JSON file comprises a set of property descriptions of the JSON-based model.

23. The non-transitory machine readable medium of claim 22, wherein the program further comprises a set of instructions for customizing the selected API by modifying the set of property descriptions in the JSON file of the API's associated JSON-based model.

24. The non-transitory machine readable medium of claim 22, wherein the set of property descriptions of the JSON-based model is associated with a set of properties of a table in the database.

25. The non-transitory machine readable medium of claim 17, wherein at least one API in the selected set of APIs is an aggregated API, wherein the aggregated API is associated with at least two JSON-based models.

* * * * *

UNITED STATES PATENT AND TRADEMARK OFFICE
CERTIFICATE OF CORRECTION

| | | |
|---|---|---|
| PATENT NO. | : 9,513,941 B2 | Page 1 of 1 |
| APPLICATION NO. | : 14/490651 | |
| DATED | : December 6, 2016 | |
| INVENTOR(S) | : Zhaohui Feng et al. | |

It is certified that error appears in the above-identified patent and that said Letters Patent is hereby corrected as shown below:

On the Title Page

Item (72) Please change Inventor "Miroslov Bajitos" to "Miroslav Bajtos".

Signed and Sealed this
Fourteenth Day of August, 2018

Andrei Iancu
*Director of the United States Patent and Trademark Office*